May 16, 1933.   J. E. CADE   1,909,569
TRACTOR WHEEL BEARING
Filed Nov. 14, 1931
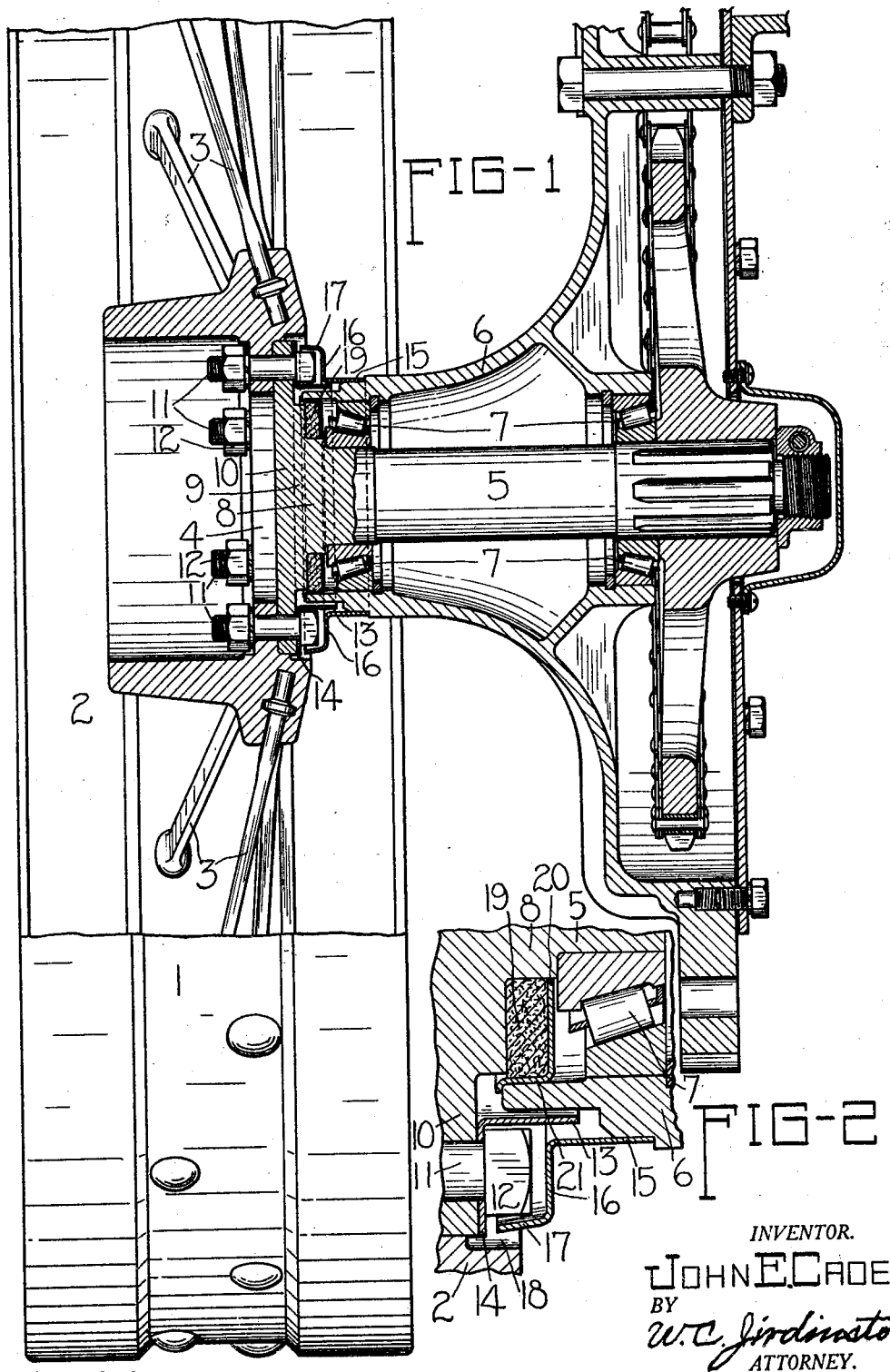
INVENTOR.
JOHN E. CADE.
BY
W.C. Jirdinston
ATTORNEY.
WITNESS
WALTER ACKERMAN Patented May 16, 1933

1,909,569

UNITED STATES PATENT OFFICE

JOHN E. CADE, OF WATERLOO, IOWA, ASSIGNOR TO JOHN DEERE TRACTOR COMPANY, OF WATERLOO, IOWA, A CORPORATION OF IOWA

TRACTOR WHEEL BEARING

Application filed November 14, 1931. Serial No. 574,935.

My invention relates to tractors and other heavy duty vehicles and more particularly to the manner of mounting the wheel and axle and the means employed to prevent an accumulation of dust, mud or grit when said vehicles are in operation. My invention has for its object to so cover the juncture of the wheel with the axle that it will be well protected.

Referring to the drawing in which similar numerals indicate identical parts—

Figure 1 is a vertical section illustrating the application of my invention to the wheel and axle of a tractor; and, Figure 2 is an enlarged detail, in section, of Fig. 1.

The wheel 1 is of a well known type and includes the hub 2 and the spokes 3. The hub is of a shell formation, is open at both ends, as shown, and adjacent the inner end is provided with an internal annular flange 4. The axle 5 is journaled at both ends in a housing 6 and provided with roller bearings 7. The wheel end of the axle is formed of stepped portions 8, 9 and a flange 10; the flange 10 is secured to the flange 4 by bolts 11 passed through both flanges and fastened by nuts 12.

The end of the housing 6 is reduced in diameter and covered by a collar 13 integral with a disk rim 14 which is secured to the flange 4 by the bolts 11. A larger collar 15 fits tightly on the housing 6, and extends to a web 16, integral therewith and vertically disposed, to the outer edge of which, and integral therewith, is a collar 17 increasing in diameter to its free edge to present an inclined surface toward the hub; the collar 17 projects within the adjacent open end of the hub 2 so as to cover the bolt heads 12, but spaced from the bolt heads and from the rim 14 and the adjacent inner surface of the periphery of the open end 18 of the hub. A felt washer 19 is held in place against the stepped portions 8 and 9 by a retainer 20 formed with a collar 21, the free edge of which is bent outwardly over the rim of the housing.

It will be noted that the collars 15 and 17 are stationary and that the collar 13 rotates with the hub 6 to which it is attached. Now if no means were employed to protect the hub and axle bearings they would soon be damaged beyond repair by dust, grit or mud. I have prevented this damage, to a greater extent than formerly, by my invention for while the movable and stationary collars do not contact their positions, relative to each other, present a maze between them through which it is difficult for dust, grit of mud to penetrate to do material damage to the locations for which protection is desirable. By increasing the diameter of the collar 17 toward the hub an inclined surface is presented which tends to shed dust or grit, an accumulation of which on the inclined inner surface of the collar 17 will be broken and removed by the bolt heads as the wheel rotates.

What I claim is:—

1. The combination of a housing, an axle rotatably journaled therein, a wheel having a shell hub, an annular flange on the inner face of said hub and adjacent one end thereof, a flange on the axle, bolts through said flanges securing the wheel and axle together, a collar fixed on the housing and connected by a radial disk with a collar of greater diameter projected to cover the bolt heads, and a collar covering the outer end of the housing out of contact therewith and having a disk rim secured to the axle flange by the bolts securing the wheel and axle together.

2. The combination of a housing, an axle rotatably journaled therein, a wheel having a shell hub, an annular flange on the inner face of said hub adjacent the inner end thereof, a flange on the axle, bolts through said flanges securing the wheel and axle together, a collar fixed on the housing, a radial disk integral with the outer rim of said collar, a collar of greater diameter integral with the outer rim of said disk, said diameter increasing toward the axle flange to present an incline and cover the bolt heads, and a collar enveloping the end of said housing free of contact therewith and having a disk rim secured to the axle flange by said bolts.

3. The combination of a housing, an axle rotatably journaled therein, a wheel having a shell hub, an annular flange on the inner face of said hub adjacent the inner end thereof, a flange on the axle, bolts through said flanges securing the wheel hub and axle together, a collar fixed on the housing, a space between part of said collar and the housing, a radial disk integral with the outer rim of said collar, a collar of greater diameter integral with said disk and increasing in diameter toward the axle flange to present an incline and cover the heads of the bolts, a collar enveloping the end of said housing and projecting into said space, and having a disk rim secured to the axle flange by said bolts.

JOHN E. CADE.